United States Patent
Kang et al.

(10) Patent No.: US 12,104,714 B2
(45) Date of Patent: Oct. 1, 2024

(54) VALVE ACTUATOR

(71) Applicant: LG ELECTRONICS INC., Seoul (KR)

(72) Inventors: Joohang Kang, Seoul (KR); Youngchan Ahn, Seoul (KR); Hyeonho Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 17/570,130

(22) Filed: Jan. 6, 2022

(65) Prior Publication Data

US 2023/0057656 A1  Feb. 23, 2023

(30) Foreign Application Priority Data

Aug. 20, 2021  (KR) .................. 10-2021-0110070

(51) Int. Cl.
| | |
|---|---|
| *F16K 5/06* | (2006.01) |
| *F16K 31/04* | (2006.01) |
| *F16K 31/524* | (2006.01) |

(52) U.S. Cl.
CPC .......... *F16K 5/0647* (2013.01); *F16K 31/047* (2013.01); *F16K 31/52425* (2013.01)

(58) Field of Classification Search
CPC .................................................. F16K 31/047
See application file for complete search history.

(56) References Cited

U.S. PATENT DOCUMENTS

| | | | | |
|---|---|---|---|---|
| 4,754,949 A | * | 7/1988 | Fukamachi | ........... F16K 31/535 475/2 |
| 4,808,869 A | | 2/1989 | Kopp | |
| 6,097,123 A | * | 8/2000 | Weiss | ..................... H02K 7/116 251/71 |
| 6,173,939 B1 | * | 1/2001 | Dottavio | ................. F16K 1/221 251/305 |

(Continued)

FOREIGN PATENT DOCUMENTS

| | | |
|---|---|---|
| DE | 112015003071 | 3/2017 |
| DE | 112018004762 | 6/2020 |

(Continued)

OTHER PUBLICATIONS

Notice of Allowance in Korean Appln. No. 10-2021-0110070, mailed on May 8, 2023, 4 pages (with English translation).

(Continued)

*Primary Examiner* — Eric Keasel
(74) *Attorney, Agent, or Firm* — Fish & Richardson P.C.

(57) ABSTRACT

A valve actuator includes: a housing, a motor that is disposed in the housing and that includes a motor shaft, a drive gear coupled to the motor shaft, a transfer gear that engages with the drive gear and that is configured to, based on the drive gear rotating, be rotated according to a predetermined gear ratio, an output shaft disposed in the housing, an output gear that is coupled to the output shaft and that engages with the transfer gear, and a stopper that is disposed in the housing and that is configured to control a rotation radius of the output gear. The transfer gear comprises an inner part, an outer part disposed at an outside of the inner part, a first magnet disposed at the outer part, and a second magnet that is disposed at the inner part and that faces the first magnet.

20 Claims, 16 Drawing Sheets

(56) References Cited

U.S. PATENT DOCUMENTS

| | | | |
|---|---|---|---|
| 8,221,247 B2* | 7/2012 | Lai | H02K 49/106 |
| | | | 464/30 |
| 2010/0170763 A1 | 7/2010 | Lai et al. | |

FOREIGN PATENT DOCUMENTS

| | | |
|---|---|---|
| GB | 2340209 | 2/2000 |
| JP | 2001-254863 | 9/2001 |
| JP | 2009-138856 | 6/2009 |
| KR | 100392198 | 7/2003 |
| KR | 10-2007-0070498 | 7/2007 |
| KR | 10-1616578 | 4/2016 |
| KR | 101611977 | 4/2016 |

OTHER PUBLICATIONS

Office Action in Korean Appln. No. 10-2021-0110070, mailed on Nov. 13, 2022, 14 pages (with English translation).
Extended European Search Report in European Appln. No. 21218051.7, dated Jun. 27, 2022, 17 pages.

* cited by examiner

VALVE ACTUATOR

CROSS-REFERENCE TO RELATED APPLICATION

This application is based on and claims priority under 35 U.S.C. 119 to Korean Patent Application No. 10-2021-0110070, filed on Aug. 20, 2021, in the Korean Intellectual Property Office, the disclosure of which is herein incorporated by reference in its entirety.

TECHNICAL FIELD

The disclosure relates to a valve actuator. More particularly, the disclosure relates to a valve actuator for opening and closing a ball valve.

DESCRIPTION OF RELATED ART

Typically, a ball valve is an opening/closing means that is widely used to supply or cut off the supply of a working fluid to a required place through a pipe coupled to two opposite sides of the main body of the valve by opening and closing the pipe by automatically rotating a ball thereinside by way of a motor.

A conventional ball valve actuator connects the shaft of the gear motor with the output shaft of the ball valve through a cam and uses a sensor or step motor to turn the output shaft by an intended angle. In this case, a physical stopper is used to limit the rotation angle of the output shaft.

However, if torque is applied from the motor with the gear in contact with the stopper, the gear may be damaged.

To address this issue, Korean Patent No. 0392198 discloses controlling to stop the rotation of the motor, with the gear in contact with the stopper, through a limiter switch.

In this case, due to addition of components, such as a separate sensor for detecting contact of the gear to the stopper, a separate limiter switch, or a separate printed circuit board (PCB) for stop signals, the size of the product and manufacturing costs may increase.

PRIOR TECHNICAL DOCUMENTS (Patent Document 1) Korean Patent No. 10-0392198B1 registered on Jul. 22, 2003.

SUMMARY

An object of the disclosure is to provide a valve actuator capable of preventing damage to a gear when torque is applied from a motor with the gear in contact with a stopper.

Another object of the disclosure is to provide a valve actuator capable of damping the torque of a motor applied due to over-output.

Another object of the disclosure is to provide a valve actuator capable of reducing manufacturing costs.

Another object is to provide a valve actuator capable of operating even under a high-speed slip condition, e.g., at thousands of rpm.

Another object of the disclosure is to provide a valve actuator capable of lubricating a component to prevent damage to the component under a high-speed slip condition.

According to an aspect of the disclosure, a valve actuator may comprise a housing, a motor disposed on the housing, a drive gear coupled to a motor shaft of the motor, a transfer gear circumscribing the drive gear and rotating according to a predetermined gear ratio when the drive gear rotates, an output gear coupled to an output shaft and circumscribing the transfer gear, and a stopper disposed in the housing and limiting a rotation radius of the output gear.

The transfer gear may comprise an outer part, an inner part disposed in the outer part, a first magnet disposed on the outer part, and a second magnet disposed on the inner part and facing the first magnet.

Thus, since the gear shaft idles due to the first magnet and the second magnet when the torque of the motor is applied, with the output gear and the stopper in contact with each other, it is possible to prevent damage to the drive gear, transfer gear, and output gear.

It is also possible to prevent damage to the gears without separate components, such as a sensor for detecting contact of the gear to the stopper, a limiter switch, or a PCB for stop signals, thus reducing the size and manufacturing costs of the product.

The first magnet and the second magnet may have different polarities.

An attractive force between the first magnet and the second magnet may be larger than an average output of the motor and smaller than a maximum output of the motor. Thus, since the gear shaft idles due to the first magnet and the second magnet during over-output of the motor, it is possible to damp the torque of the motor applied due to over-output and hence prevent damage to the drive gear, transfer gear, and output gear.

The first magnet may comprise a plurality of first magnet units having different polarities from adjacent magnet units, and the second magnet may comprise a plurality of second magnet units having different polarities from adjacent magnet units and individually facing the plurality of first magnet units.

The motor may be a DC motor. In other words, since it may be applied to DC motors that are inexpensive as compared with AC motors, it is possible to reduce the manufacturing costs of the product.

An upper end and lower end of the inner part may be supported by an inner surface of the housing. An upper or lower end of the outer part may be vertically supported by the inner part. In this case, a height of the first magnet may be larger than a height of the second magnet. Thus, since the outer part is prevented from escaping off while maintaining a floating state with respect to the inner part, it may operate even under a high-speed slip condition, e.g., at thousands of rpm.

When the upper end of the outer part is vertically supported by the inner part, a central area of the first magnet may be disposed above a central area of the second magnet, and when the lower end of the outer part is vertically supported by the inner part, the central area of the first magnet may be disposed below the central area of the second magnet.

The inner part may comprise a groove formed in an area supporting the upper end or lower end of the outer part. A lubricant may be disposed in the groove. The lubricant may perform lubrication to prevent damage to the components under the high-speed slip condition.

The transfer gear may comprise a first gear circumscribing the drive gear, a second gear circumscribing the first gear, and a third gear circumscribing the second gear. The first gear may comprise the outer part, the inner part, the first magnet, and the second magnet.

According to an aspect of the disclosure, a valve actuator may comprise a housing, a motor disposed on the housing, a drive gear coupled to a motor shaft of the motor, an output gear coupled to an output shaft and circumscribing the drive gear, and a stopper disposed in the housing and limiting a rotation radius of the output gear.

The drive gear may comprise an outer part, an inner part disposed in the outer part, a first magnet disposed on the outer part, and a second magnet disposed on the inner part and facing the first magnet.

Thus, since the gear shaft idles due to the first magnet and the second magnet when the torque of the motor is applied, with the output gear and the stopper in contact with each other, it is possible to prevent damage to the drive gear and output gear.

It is also possible to prevent damage to the gears without separate components, such as a sensor for detecting contact of the gear to the stopper, a limiter switch, or a PCB for stop signals, thus reducing the size and manufacturing costs of the product.

Further, since the gear shaft idles due to the first magnet and the second magnet during over-output of the motor, it is possible to damp the torque of the motor applied due to over-output and hence prevent damage to the drive gear and output gear.

The inner part may be coupled to a motor shaft and rotate along with the motor shaft. An upper or lower end of the outer part may be vertically supported by the inner part. In this case, a height of the first magnet may be larger than a height of the second magnet. Thus, since the outer part is prevented from escaping off while maintaining a floating state with respect to the inner part, it may operate even under a high-speed slip condition, e.g., at thousands of rpm.

When the upper end of the outer part is vertically supported by the inner part, a central area of the first magnet may be disposed above a central area of the second magnet, and when the lower end of the outer part is vertically supported by the inner part, the central area of the first magnet may be disposed below the central area of the second magnet.

The inner part may comprise a groove formed in an area supporting the upper end or lower end of the outer part. A lubricant may be disposed in the groove. The lubricant may perform lubrication to prevent damage to the components under the high-speed slip condition.

According to an aspect of the disclosure, a valve actuator may comprise a housing, a motor disposed on the housing, a drive gear coupled to a motor shaft of the motor, a transfer gear circumscribing the drive gear and rotating according to a first gear ratio when the drive gear rotates, an output gear coupled to an output shaft and circumscribing the transfer gear, and a stopper disposed in the housing and limiting a rotation radius of the output gear.

The transfer gear may comprise a first transfer gear, a second transfer gear rotating according to a second gear ratio when the first transfer gear rotates, a cylindrical first magnet disposed on the first transfer gear, and a cylindrical second magnet disposed on the second transfer gear. The first magnet and the second magnet may horizontally overlap each other, with a predetermined gap formed therebetween.

Thus, since the gear shaft idles due to the first magnet and the second magnet when the torque of the motor is applied, with the output gear and the stopper in contact with each other, it is possible to prevent damage to the drive gear, transfer gear, and output gear.

It is also possible to prevent damage to the gears without separate components, such as a sensor for detecting contact of the gear to the stopper, a limiter switch, or a PCB for stop signals, thus reducing the size and manufacturing costs of the product.

Further, since the gear shaft idles due to the first magnet and the second magnet during over-output of the motor, it is possible to damp the torque of the motor applied due to over-output and hence prevent damage to the drive gear, transfer gear, and output gear.

According to an aspect of the disclosure, a valve actuator may comprise a housing, a motor disposed on the housing, a drive gear coupled to a motor shaft of the motor, a cylindrical first magnet coupled to the drive gear, an output gear coupled to an output shaft, a cylindrical second magnet coupled to the output gear, and a stopper disposed in the housing and limiting a rotation radius of the output gear.

The first magnet and the second magnet horizontally overlap each other, with a predetermined gap formed therebetween.

Thus, since the gear shaft idles due to the first magnet and the second magnet when the torque of the motor is applied, with the output gear and the stopper in contact with each other, it is possible to prevent damage to the drive gear and output gear.

It is also possible to prevent damage to the gears without separate components, such as a sensor for detecting contact of the gear to the stopper, a limiter switch, or a PCB for stop signals, thus reducing the size and manufacturing costs of the product.

Further, since the gear shaft idles due to the first magnet and the second magnet during over-output of the motor, it is possible to damp the torque of the motor applied due to over-output and hence prevent damage to the drive gear and output gear.

The first magnet may comprise a plurality of first magnet units circumferentially arranged, and the second magnet may comprise a plurality of second magnet units circumferentially arranged. The plurality of first magnet units may be magnetized to have different poles from neighboring magnet units, and the plurality of second magnet units may be magnetized to have different poles from neighboring magnet units. The first magnet unit and the second magnet unit facing each other, among the plurality of first magnet units and the plurality of second magnet units, may have different polarities.

The ratio of the number of the plurality of first magnet units to the number of the plurality of second magnet units may be identical to the second gear ratio.

According to the disclosure, it is possible to provide a valve actuator capable of preventing damage to a gear when torque is applied from a motor with the gear in contact with a stopper.

It is also possible to provide a valve actuator capable of damping the torque of a motor applied due to over-output.

It is also possible to provide a valve actuator capable of reducing manufacturing costs.

It is also possible to provide a valve actuator capable of operating even under a high-speed slip condition, e.g., at thousands of rpm.

It is also possible to provide a valve actuator capable of lubricating a component to prevent damage to the component under a high-speed slip condition.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the disclosure are described in detail with reference to the accompanying drawings. The same reference denotations may be used to refer to the same or similar elements throughout the specification and the drawings, and no duplicate description is given.

It will be understood that when an element or layer is referred to as being "on," "connected to," "coupled to," or "adjacent to" another element or layer, it can be directly on, connected, coupled, or adjacent to the other element or layer, or intervening elements or layers may be present.

When determined to make the subject matter of the disclosure unclear, the detailed description of the known art or functions may be skipped. The accompanying drawings are provided merely for a better understanding of the disclosure and the technical spirit or the scope of the disclosure are not limited by the drawings.

As used herein, the term "disclosure" may be replaced with other terms, such as "document," "specification," or "description."

Figure 1:
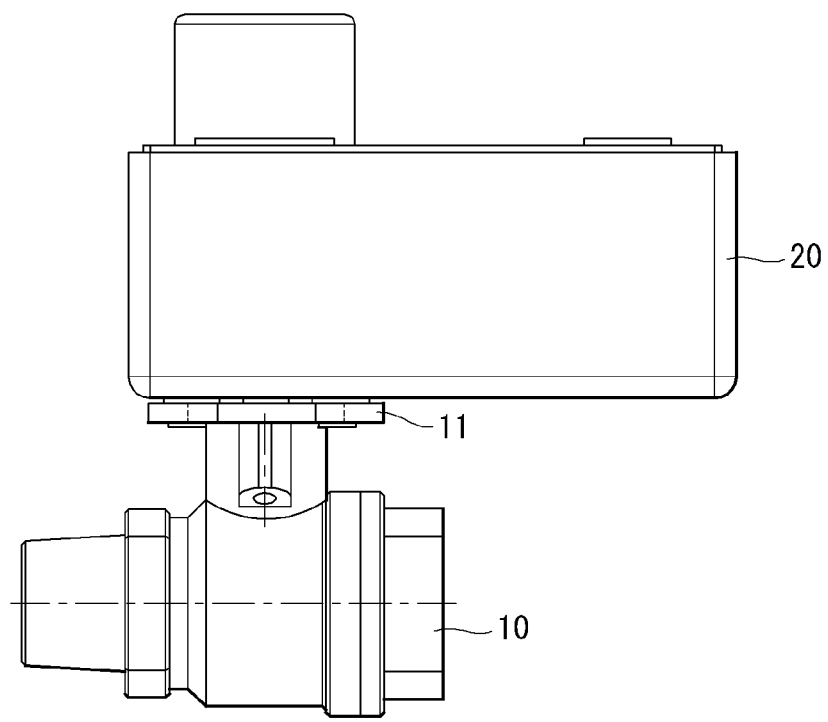
FIG. 1 is a front view illustrating a ball valve and a valve actuator according to a first embodiment of the disclosure.
Figure 2:
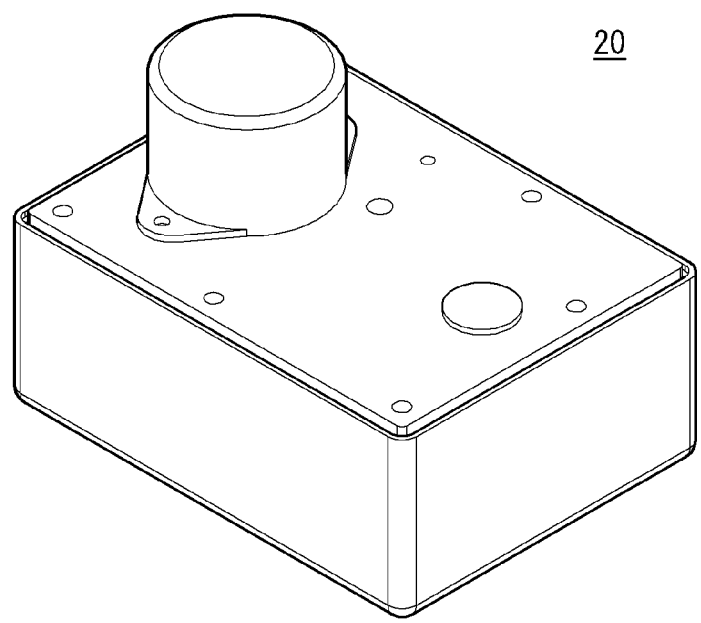
FIG. 2 is a perspective view illustrating a valve actuator according to the first embodiment of the disclosure.
Figure 3:
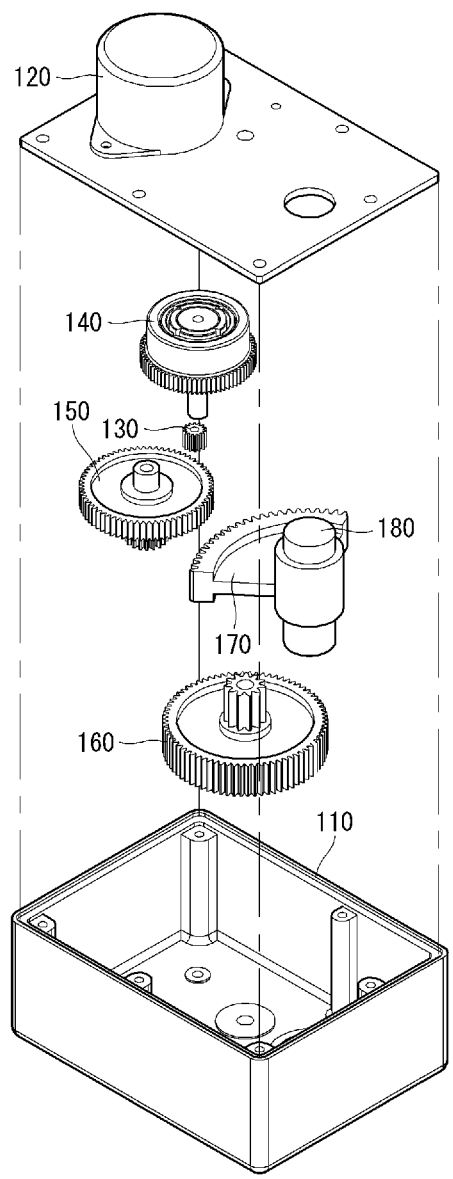
FIG. 3 is an exploded perspective view illustrating a valve actuator according to the first embodiment of the disclosure.
Figure 4:
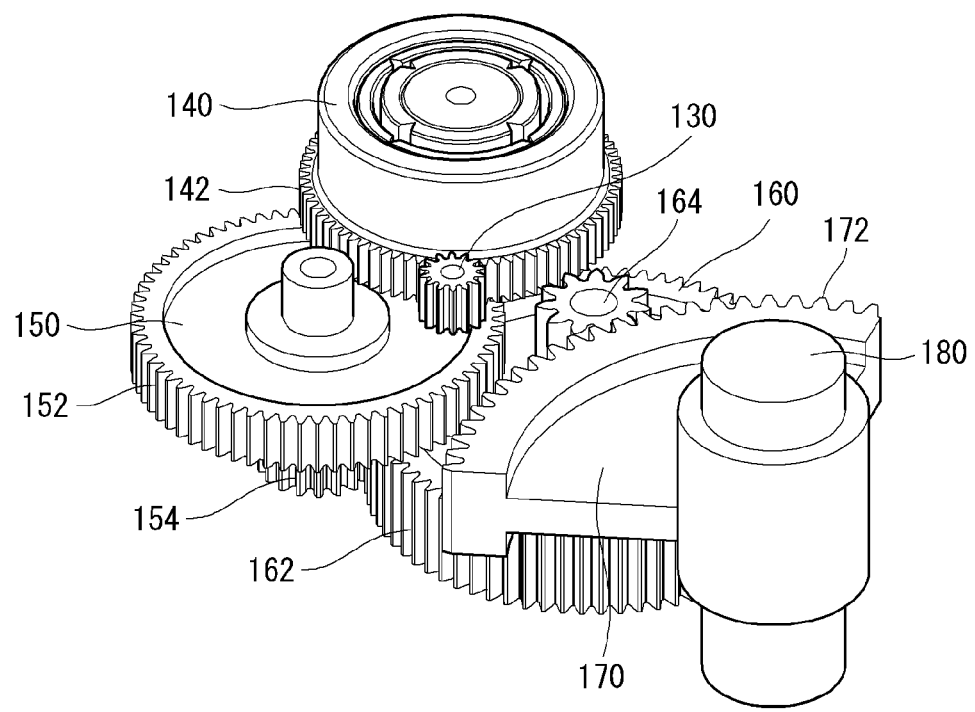
FIGS. 4 and 5 are perspective views illustrating some components of a valve actuator according to the first embodiment of the disclosure.
Figure 5:
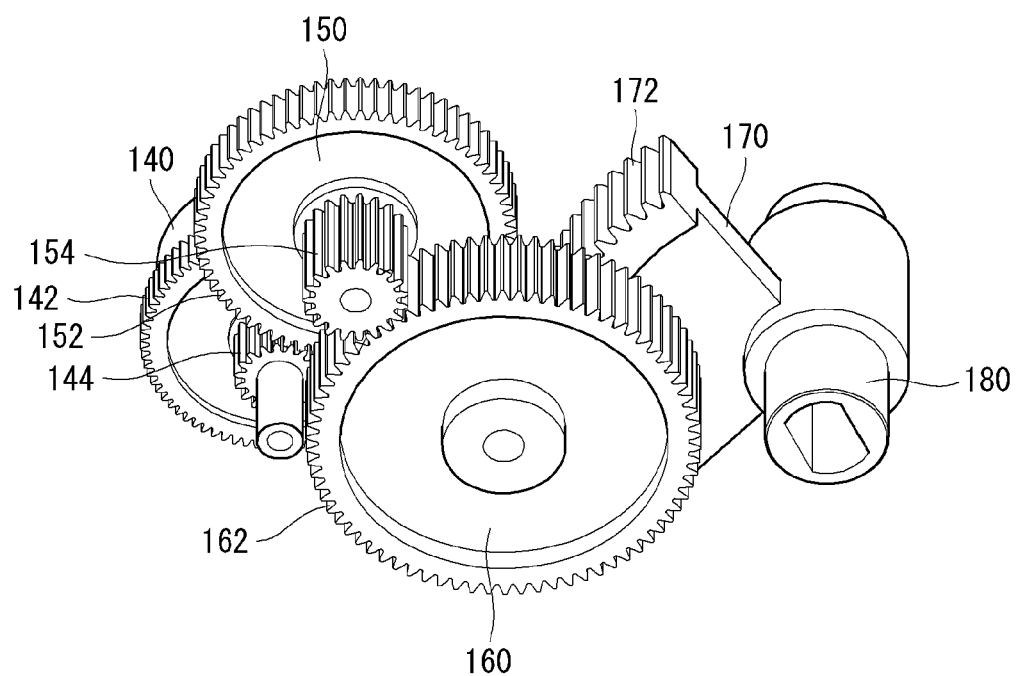
Figure 6:
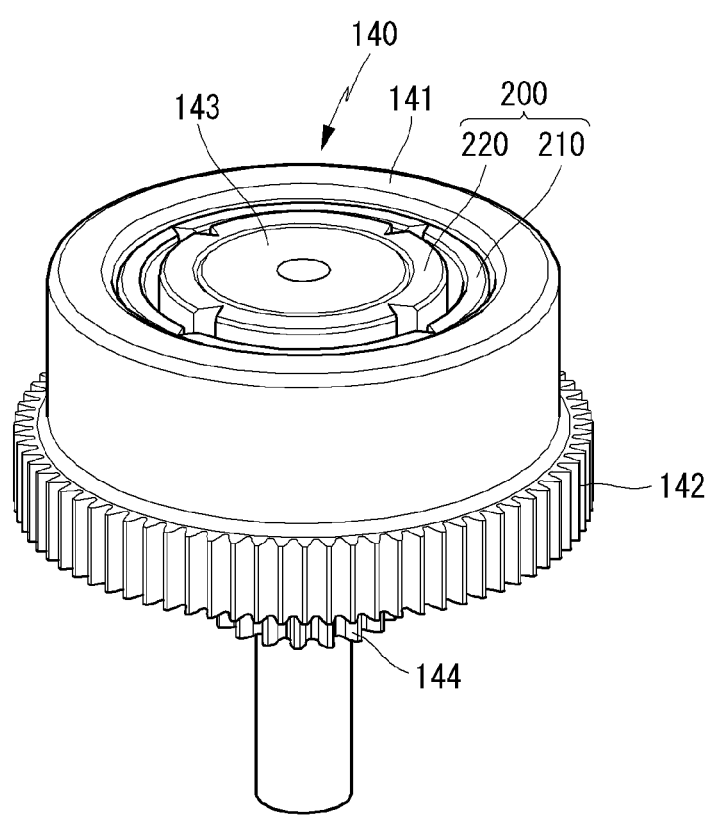
FIG. 6 is a perspective view illustrating a first gear according to the first embodiment of the disclosure.
Figure 7:
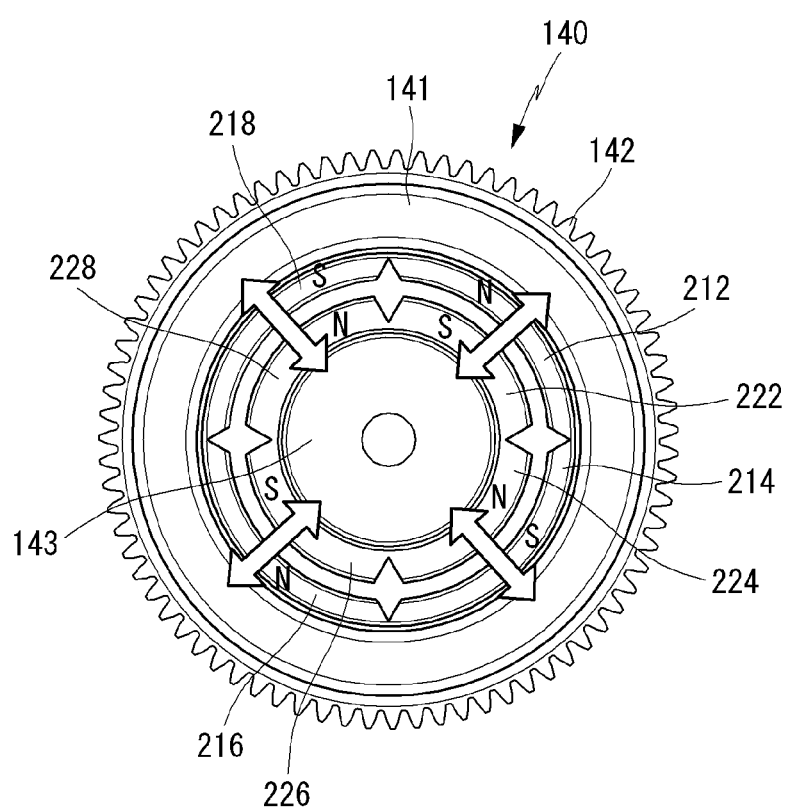
FIG. 7 is a plan view illustrating a first gear according to the first embodiment of the disclosure.
Figure 8:
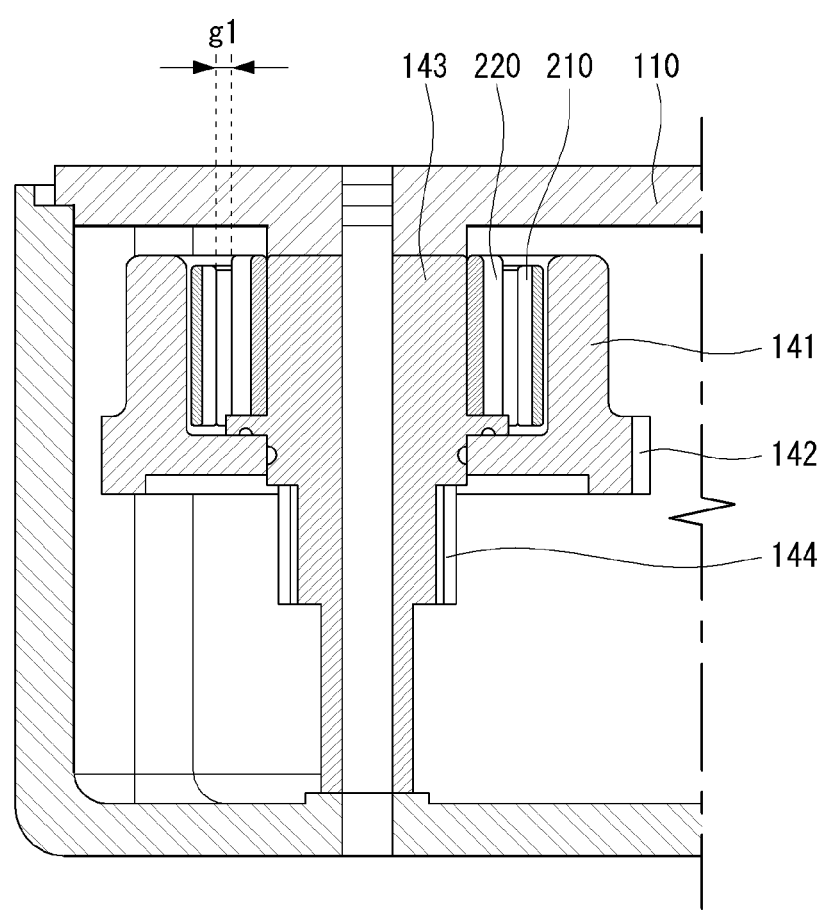
FIG. 8 is a cross-sectional view illustrating a valve actuator according to the first embodiment of the disclosure.
Figure 9:
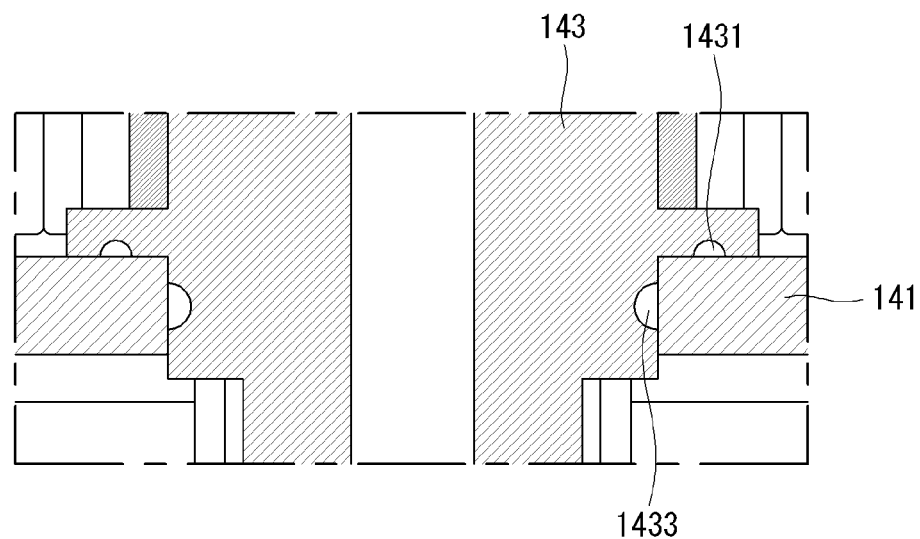
FIG. 9 is an enlarged view illustrating some components of FIG. 8.
Figure 10:
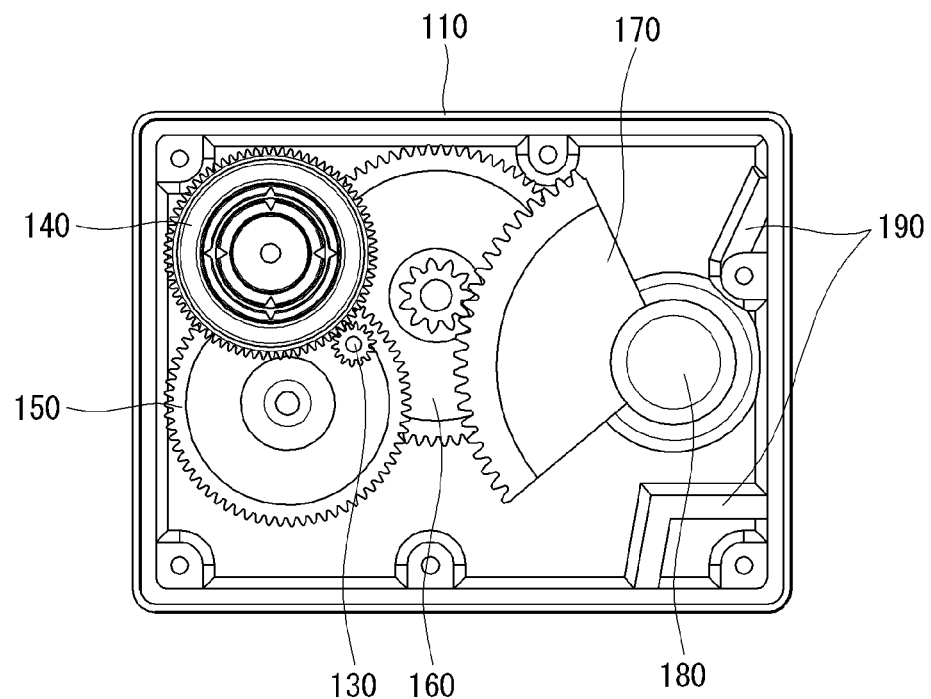
FIGS. 10, 11, and 12 are views illustrating the operation of a valve actuator according to the first embodiment of the disclosure.
Figure 11:
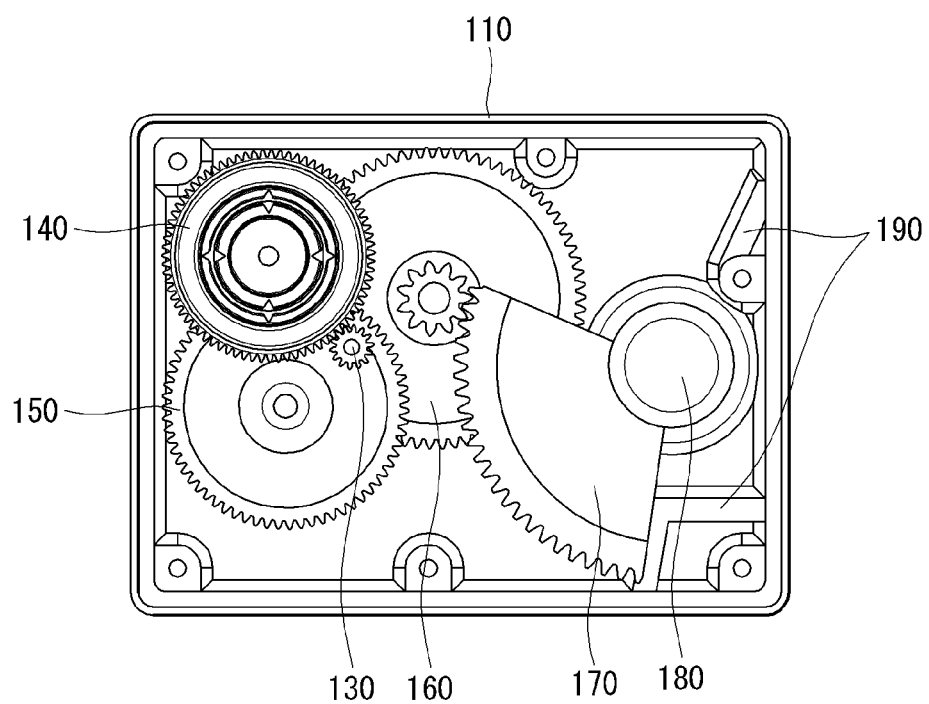
Figure 12:
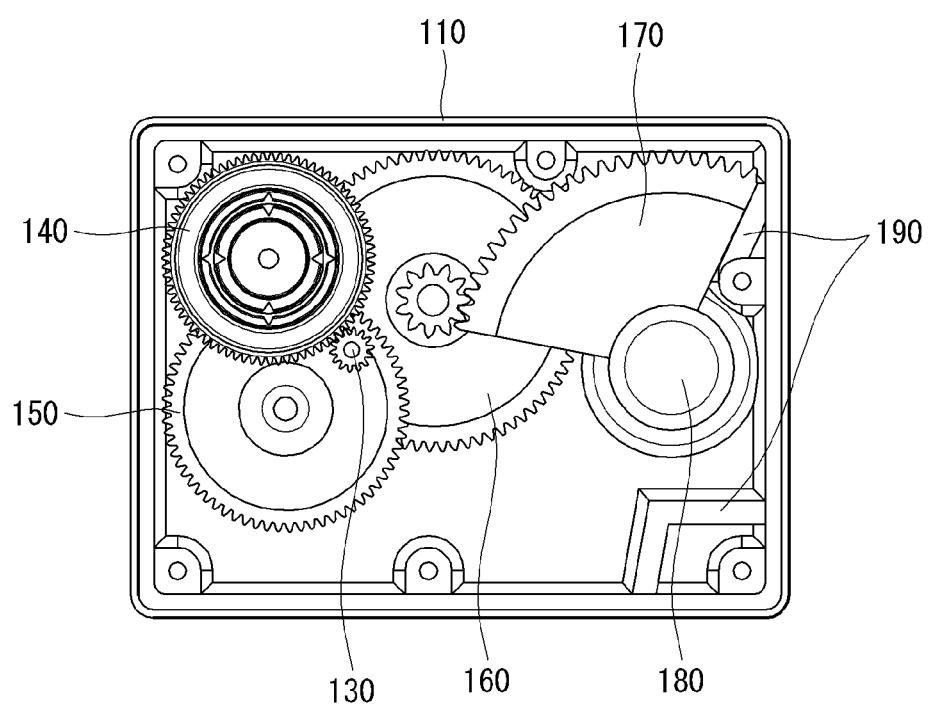
Figure 13:
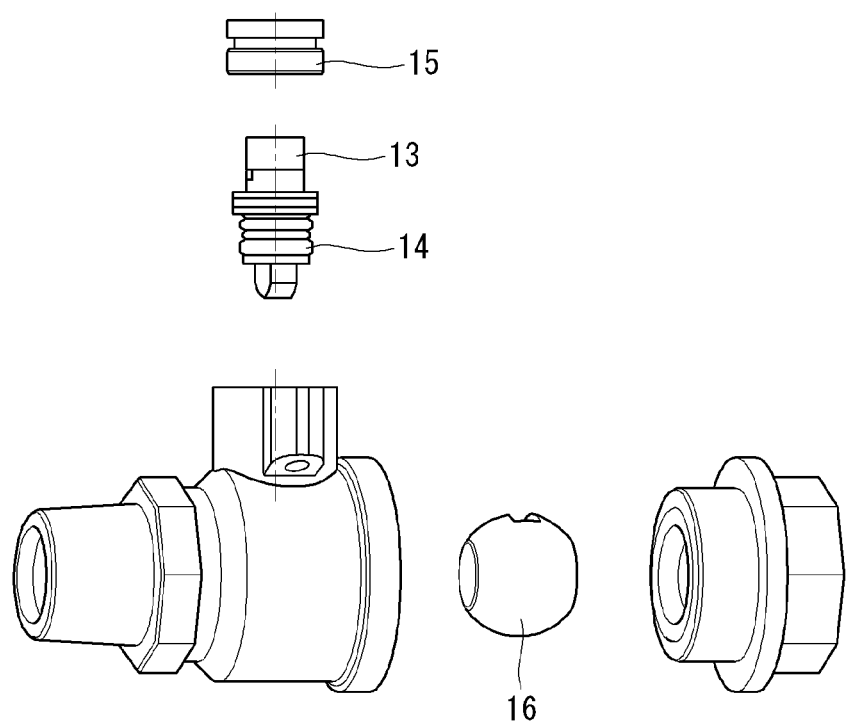
FIG. 13 is an exploded perspective view illustrating a ball valve according to the first embodiment of the disclosure.

FIG. 1 is a front view illustrating a ball valve and a valve actuator according to a first embodiment of the disclosure. FIG. 2 is a perspective view illustrating a valve actuator according to the first embodiment of the disclosure. FIG. 3 is an exploded perspective view illustrating a valve actuator according to the first embodiment of the disclosure. FIGS. 4 and 5 are perspective views illustrating some components of a valve actuator according to the first embodiment of the disclosure. FIG. 6 is a perspective view illustrating a first gear according to the first embodiment of the disclosure. FIG. 7 is a plan view illustrating a first gear according to the first embodiment of the disclosure. FIG. 8 is a cross-sectional view illustrating a valve actuator according to the first embodiment of the disclosure. FIG. 9 is an enlarged view illustrating some components of FIG. 8. FIGS. 10, 11, and 12 are views illustrating the operation of a valve actuator according to the first embodiment of the disclosure. FIG. 13 is an exploded perspective view illustrating a ball valve according to the first embodiment of the disclosure.

Referring to FIGS. 1 to 13, according to the first embodiment of the disclosure, a valve actuator 20 may include a housing 110, a motor 120, a drive gear 130, transfer gears 140, 150, and 160, an output gear 170, an output shaft 180, a stopper 190, and a magnet 200. However, the valve actuator 20 may omit some of the components or add more components.

The valve actuator 20 may be coupled to an upper portion of a plate 11 coupled to an upper portion of a ball valve 10. The output shaft 180 of the actuator 20 may be coupled to a stem 13 of the ball valve 10. As the output shaft 180 of the actuator 20 rotates, the stem 13 may rotate, and a ball 16 of the ball valve 10 may rotate, opening or closing the ball valve 10. The ball valve 10 may include a stem fixing part 15 for coupling the stem 13 and an O-ring 14 disposed under the stem 13.

The housing 110 may be formed in a hexahedral shape. The housing 110 may form the exterior of the valve actuator 20. The housing 110 may be disposed on one side of the ball valve 10. The housing 110 may be disposed on the ball valve 10. In the housing 110, the motor 120, the drive gear 130, the transfer gears 140, 150, and 160, the output gear 170, the output shaft 180, and the stopper 190 may be disposed.

The motor 120 may be disposed on the housing 110. The motor 120 may be coupled to a recess of the housing 110 so that one side thereof may be disposed in the housing 110, and the other side may protrude to the outside of the housing 110. This may enhance space efficiency. The drive gear 130 may be coupled to a motor shaft of the motor 120.

The motor 120 may a direct current (DC) motor. The motor 120 may be an alternating current (AC) motor. When the motor 120 is a DC motor, the manufacturing costs of the valve actuator 20 may be reduced as compared with when the motor 120 is an AC motor. A DC motor may present poor rpm control accuracy as compared with an AC motor, and this may be supplemented by the physical stopper 190 of the valve actuator.

The drive gear 130 may be coupled to the motor shaft of the motor 120. When the motor shaft of the motor 120 rotates in a first direction, the drive gear 130 may rotate in the first direction and, when the motor shaft rotates in a second direction, the drive gear 130 may rotate in the second direction. The drive gear 130 may circumscribe the transfer gears 140, 150, and 160. The drive gear 130 may be an external gear.

The transfer gears 140, 150, and 160 may circumscribe the drive gear 130. The transfer gears 140, 150, and 160 may rotate according to a predetermined gear ratio when the drive gear 130 rotates. The transfer gears 140, 150, and 160 may circumscribe the output gear 170. The transfer gears 140, 150, and 160 may reduce the speed of the drive gear 130 at a predetermined gear ratio and transfer it to the output gear 170. Thus, the transfer gears 140, 150, and 160 may increase the torque transferred from the drive gear 130 and transfer it to the output gear 170.

The transfer gears 140, 150, and 160 may include a first gear 140, a second gear 150, and a third gear 160.

The first gear 140 may circumscribe the drive gear 130. The first gear 140 may circumscribe the second gear 150. The first gear 140 may circumscribe the drive gear 130 and may rotate at a predetermined gear ratio with respect to the drive gear 130. The first gear 140 may circumscribe the second gear 150 to rotate the second gear 150 at a predetermined gear ratio with respect to the first gear 140.

The first gear 140 may include an outer part 141, a first external gear 142, an inner part 143, a second external gear 144, and magnets 200.

The outer part 141 may be disposed outside the inner part 143. The outer part 141 may be radially spaced apart from the inner part 143. The first external gear 142 may be formed on the outer part 141. The first magnet 210 may be disposed on the outer part 141.

The first external gear 142 may circumscribe the drive gear 130. Thus, the outer part 141 of the first gear 140 may rotate at a predetermined gear ratio with respect to the drive gear 130.

The magnets 200 may include a first magnet 210 disposed on the outer part 141 and a second magnet 220 disposed on the inner part 143. The first magnet 210 may be radially spaced apart from the second magnet 220. For example, a predetermined gap g1 may be formed between the inner surface of the first magnet 210 and the outer surface of the second magnet 220. The second magnet 220 may be disposed in the first magnet 210.

The first magnet 210 and the second magnet 220 may have different polarities. The respective areas of the first magnet 210 and the second magnet 220, which face each other, may have different polarities. For example, if a first area of the first magnet 210 has an N pole, a first area of the second magnet 220 facing the first area of the first magnet 210 may have an S pole. The first magnet 210 may rotate according to the rotation of the outer part 141, and the second magnet 220 may rotate along with the first magnet 210 by magnetic force.

Thus, when the torque of the motor 120 is applied while the output gear 170 and the stopper 190 are in contact, the outer part 141 idles with respect to the inner part 143 due to the first magnet 210 and the second magnet 220, preventing damage to the drive gear 130, the transfer gears 140, 150, and 160, and the output gear 170.

Further, it is possible to prevent damage to the drive gear 130, the transfer gears 140, 150, and 160, and the output gear 170 without separate components, such as a sensor for detecting contact of the output gear 170 to the stopper 190, a limiter switch, or a PCB for stop signals, thus reducing the size and manufacturing costs of the product.

The attractive force between the first magnet 210 and the second magnet 220 may be larger than the average output of the motor 120 and smaller than the maximum output of the motor 120. Thus, when the motor 120 over-outputs, the outer part 141 idles with respect to the inner part 143 due to the first magnet 210 and the second magnet 220, damping the torque of the motor 120 applied due to the over-output and hence preventing damage to the drive gear 130, the transfer gears 140, 150, and 160, and the output gear 170. In particular, this may compensate for the over-output of the motor 120 that may occur if the motor 120 is formed of a low-cost DC motor.

The first magnet 210 may include a plurality of first magnet units 212, 214, 216, and 218 having polarities different from those of adjacent magnet units. The second magnet 220 may include a plurality of second magnet units 222, 224, 226, and 228 having different polarities from those of adjacent magnet units and facing the plurality of first magnet units 212, 214, 216, and 218, respectively. For example, a 1-1th magnet unit 212 may have an N pole, a 1-2th magnet unit 214 may have an S pole, a 1-3th magnet unit 216 may have an N pole, and a 1-4th magnet unit 218 may have an S pole. A 2-1th magnet unit 222 may have an S pole, a 2-2th magnet unit 224 may have an N pole, a 2-3th magnet unit 226 may have an S pole, and a 2-4th magnet unit 228 may have an N pole. In the first embodiment of the disclosure, the number of the plurality of first magnet units 212, 214, 216, and 218 and the number of the plurality of second magnet units 222, 224, 226, and 228 each are four. However, the number of first magnet units and the number of second magnet units each may be two.

The inner part 143 may be disposed in the outer part 141. The inner part 143 may be radially spaced apart from the outer part 141. The second external gear 144 may be formed on the inner part 143. The second magnet 220 may be disposed on the outer part 143. The outer part 143 may rotate according to the rotation of the second magnet 220.

An upper end and lower end of the inner part 143 may be supported by the inner surface of the housing 110, and an upper or lower end of the outer part 131 may be vertically supported by the inner part 143. In this case, the height of the first magnet 210 may be larger than the height of the second magnet 220. Thus, since the outer part 141 is prevented from escaping off while maintaining a floating state with respect to the inner part 143, it may operate even under a high-speed slip condition, e.g., at thousands of rpm.

As illustrated in FIG. 8, when the lower end of the outer part 141 is vertically supported by the inner part 143, a central area of the first magnet 210 may be disposed below a central area of the second magnet 220.

Alternatively, when the upper end of the outer part 141 is vertically supported by the inner part 143, the central area of the first magnet 210 may be disposed above the central area of the second magnet 220.

The inner part 143 may include grooves 1431 and 1433 formed in an area supporting the upper end or lower end of the outer part 141. In this case, the valve actuator 20 may include a lubricant disposed in the grooves 1431 and 1433. The lubricant may lubricate the inner part 143 and the outer part 141 to prevent damage to the inner part 143 and the outer part 141 under the high-speed slip condition.

The second external gear 144 may be formed on the inner part 143. The second external gear 144 may be vertically spaced apart from the first external gear 142. This may enhance space efficiency. A radial size of the second external gear 144 may be smaller than a radial size of the first external gear 142. The second external gear 144 may circumscribe the second gear 150. The second external gear 144 may rotate the second gear 150 at a predetermined gear ratio with respect to the first gear 140.

The second gear 150 may circumscribe the first gear 140. The second gear 150 may circumscribe the third gear 160. The second gear 150 may circumscribe the first gear 140 and may rotate at a predetermined gear ratio with respect to the first gear 140. The second gear 150 may circumscribe the third gear 160 to rotate the third gear 160 at a predetermined gear ratio with respect to the second gear 150.

The second gear 150 may include a third external gear 152 and a fourth external gear 154. The third external gear 152 may circumscribe the second external gear 144 of the first gear 140, and the fourth external gear 154 may circumscribe the third gear 160. The third external gear 152 and the fourth external gear 154 may be vertically spaced apart from each other. This may enhance space efficiency. A radial size of the fourth external gear 154 may be smaller than a radial size of the third external gear 152.

The third gear 160 may circumscribe the second gear 150. The third gear 160 may circumscribe the output gear 170.

The third gear 160 may circumscribe the second gear 150 and may rotate at a predetermined gear ratio with respect to the second gear 150. The third gear 160 may circumscribe the output gear 170 to rotate the output gear 170 at a predetermined gear ratio with respect to the third gear 160.

The third gear 160 may include a fifth external gear 162 and a sixth external gear 164. The fifth external gear 162 may circumscribe the fourth external gear 154 of the second gear 150, and the sixth external gear 164 may circumscribe the output gear 170. The fifth external gear 162 and the sixth external gear 164 may be vertically spaced apart from each other. This may enhance space efficiency. A radial size of the fifth external gear 162 may be larger than a radial size of the sixth external gear 164.

In the embodiment of the disclosure, as an example, the transfer gears 140, 150, and 160 are described as including three gears, but the transfer gears 140, 150, and 160 may be understood as including one or more gears.

The output gear 170 may circumscribe the transfer gears 140, 150, and 160. The output gear 170 may be coupled to the output shaft 180. The rotation radius of the output gear 170 may be limited by the stopper 190. The output gear 170 may be rotated in one direction or another direction by the transfer gears 140, 150, and 160 to rotate the output shaft 180 in the one direction or the other direction.

The output shaft 180 may be disposed in the housing 110. The output shaft 180 may pass through the housing 110, and one side thereof may be coupled to the output gear 170 while the opposite side thereof may be coupled to the stem 13 of the ball valve 10. The output shaft 180 may be rotated in one direction or another direction by the output gear 170 to rotate the stem 13 of the ball valve 10 in the one direction or the other direction. Thus, the ball valve 10 may be opened and closed.

The stopper 190 may be disposed in the housing 110. The stopper 190 may be formed on an inner surface of the housing 110. The stopper 190 may be disposed within a rotation radius of the output gear 170. The stopper 190 may limit the rotation angle of the output gear 170.

The operation of the valve actuator 20 is described with reference to FIGS. 10 to 12.

Assuming that the state illustrated in FIG. 10 is an initial state, the inside of the ball valve 10 may be in an open state in the initial state.

Referring to FIG. 11, when the motor 120 rotates the drive gear 130 in a first direction, the first gear 140 circumscribing the drive gear 130 may rotate in a second direction, the second gear 150 circumscribing the first gear 140 may rotate in the first direction, and the third gear 160 circumscribing the second gear 150 may rotate in the second direction, the output gear 170 circumscribing the third gear 160 may rotate in the first direction, and the output shaft 180 coupled with the output gear 170 may rotate in the first direction, allowing the inside of the ball valve 10 to turn into a closed state. In this case, the rotation radius of the output gear 170 may be limited by the stopper 190, preventing damage to the ball valve 10.

Referring to FIG. 12, when the motor 120 rotates the drive gear 130 in the second direction, the first gear 140 circumscribing the drive gear 130 may rotate in the first direction, the second gear 150 circumscribing the first gear 140 may rotate in the second direction, and the third gear 160 circumscribing the second gear 150 may rotate in the first direction, the output gear 170 circumscribing the third gear 160 may rotate in the second direction, and the output shaft 180 coupled with the output gear 170 may rotate in the second direction, allowing the inside of the ball valve 10 to turn into a closed state. In this case, the rotation radius of the output gear 170 may be limited by the stopper 190, preventing damage to the ball valve 10.

As illustrated in FIGS. 11 and 12, even when the inside of the ball valve 10 is in the closed state, the motor 120 may continue to operate. In this case, the outer part 141 idles with respect to the inner part 143 due to the first magnet 210 and the second magnet 220, preventing damage to the drive gear 130, the transfer gears 140, 150, and 160, and the output gear 170.

In the first embodiment of the disclosure, the magnets 200 have been described as being disposed in the first gear 140 as an example, but the magnets 200 may be disposed in the second gear 150 or the third gear 160. However, when the magnets 200 are disposed in the first gear 140, it is possible to effectively prevent damage to the product as compared to the magnets 200 disposed in the second gear 150 or the third gear 160.

Figure 14:
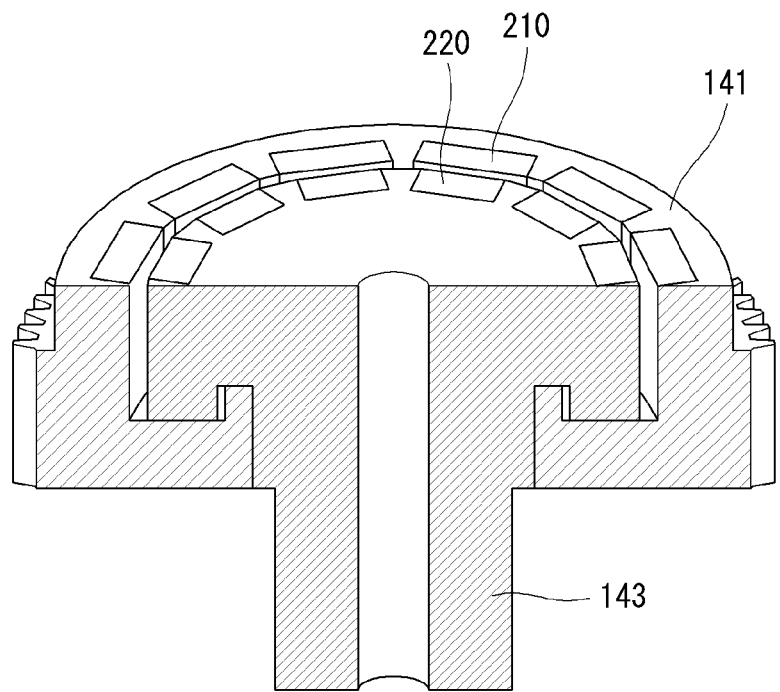
FIG. 14 is a view schematically illustrating a first gear according to a second embodiment of the disclosure.

FIG. 14 is a view schematically illustrating a first gear according to a second embodiment of the disclosure.

Referring to FIG. 14, according to the second embodiment of the disclosure, the plurality of first magnet units of the first magnet 210 disposed on the first gear 140 may be spaced apart from each other in the circumferential direction, and the plurality of second magnet units of the second magnet 220 may be spaced apart from each other in the circumferential direction.

The plurality of first magnet units of the first magnet 210 may be individually mounted in a plurality of grooves formed in the inner surface of the outer part 143. The plurality of second magnet units of the second magnet 220 may be individually mounted in a plurality of grooves formed in the outer surface of the inner part 143.

The second embodiment of the disclosure may enhance the stability of the product by increasing the coupling force of the magnets 200 to the first gear 140 as compared to the first embodiment.

Figure 15:
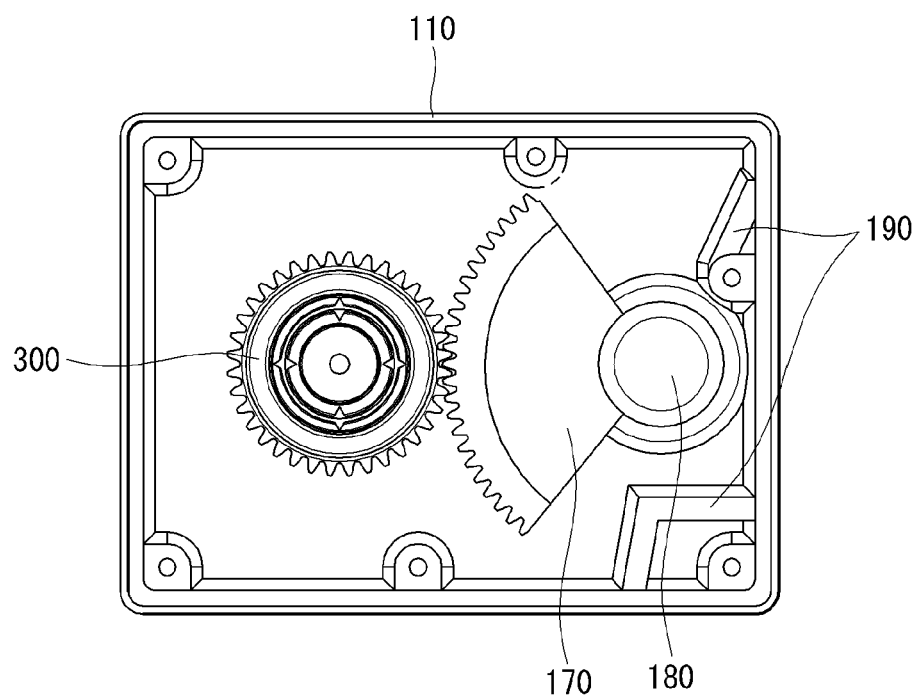
FIG. 15 is a cross-sectional view illustrating a valve actuator according to a third embodiment of the disclosure.

FIG. 15 is a cross-sectional view illustrating a valve actuator according to a third embodiment of the disclosure.

Referring to FIG. 15, according to the third embodiment of the disclosure, a valve actuator may include a housing 110, a motor 120 disposed on the housing 110, a drive gear 300 coupled to a motor shaft of the motor 120, an output gear 170 coupled to an output shaft 180 and circumscribing the drive gear 300, and a stopper 190 disposed in the housing 110 and limiting a rotation radius of the output gear 170.

It may be appreciated that detailed configurations of the valve actuator not described in connection with the third embodiment of the disclosure are identical the detailed configurations of the valve actuator 20 according to the first embodiment of the disclosure.

It may be appreciated that the valve actuator according to the third embodiment of the disclosure omits the transfer gears 140, 150, and 160 of the valve actuator 20, and the magnets 200 are installed in the drive gear 130.

The drive gear 300 may be coupled to the motor shaft of the motor 120 and may be rotated in a first direction or second direction by the motor 120. The drive gear 300 may circumscribe the output gear 170 to rotate the output gear 170 at a predetermined gear ratio.

The drive gear 300 may include an outer part, an inner part disposed inside the outer part, a first magnet disposed on the outer part, and a second magnet disposed on the inner part and facing the first magnet. The inner part of the drive gear 300 may be coupled to the motor shaft of the motor 120, and the outer part of the drive gear 300 may circumscribe the output gear 170.

Thus, when the torque of the motor 120 is applied while the output gear 170 and the stopper 190 are in contact, the inner part of the drive gear 300 idles with respect to the outer part 143 of the drive gear 300 due to the first magnet and the second magnet of the drive gear 300, preventing damage to the drive gear 300 and the output gear 170.

Further, it is possible to prevent damage to the drive gear 130 and the output gear 170 without separate components, such as a sensor for detecting contact of the output gear 170 to the stopper 190, a limiter switch, or a PCB for stop signals, thus reducing the size and manufacturing costs of the product.

Further, when the motor 120 over-outputs, the inner part of the drive gear 300 idles with respect to the outer part of the drive gear 300 due to the first magnet and the second magnet of the drive gear 300, damping the torque of the motor 120 applied due to the over-output and hence preventing damage to the drive gear 130 and the output gear 170.

The inner part of the drive gear 300 may be coupled to the motor shaft of the motor 120 to rotate together with the motor shaft. The upper end or the lower end of the outer part of the drive gear 300 may be vertically supported by the inner part of the drive gear 300. In this case, the height of the first magnet of the drive gear 300 may be larger than the height of the second magnet of the drive gear 300. Thus, since the outer part of the drive gear 300 is prevented from escaping off while maintaining a floating state with respect to the inner part of the drive gear 300, it may operate even under a high-speed slip condition, e.g., at thousands of rpm.

When the upper end of the outer part of the drive gear 300 is vertically supported by the inner part of the drive gear 300, a central area of the first magnet of the drive gear 300 may be disposed above a central area of the second magnet of the drive gear 300.

When the lower end of the outer part of the drive gear 300 is vertically supported by the inner part of the drive gear 300, a central area of the first magnet of the drive gear 300 may be disposed below a central area of the second magnet of the drive gear 300.

The inner part of the drive gear 300 may include a groove formed in an area supporting the upper end or the lower end of the outer part of the drive gear 300. Lubricant may be placed in the groove. The lubricant may perform lubrication to prevent damage to the components under the high-speed slip condition.

Figure 16:
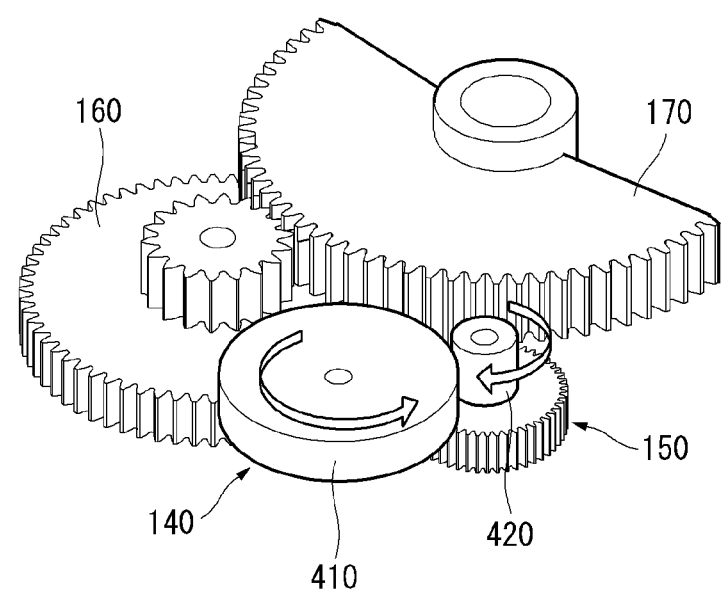
FIG. 16 is a perspective view illustrating some components of a valve actuator according to a fourth embodiment of the disclosure.
Figure 17:
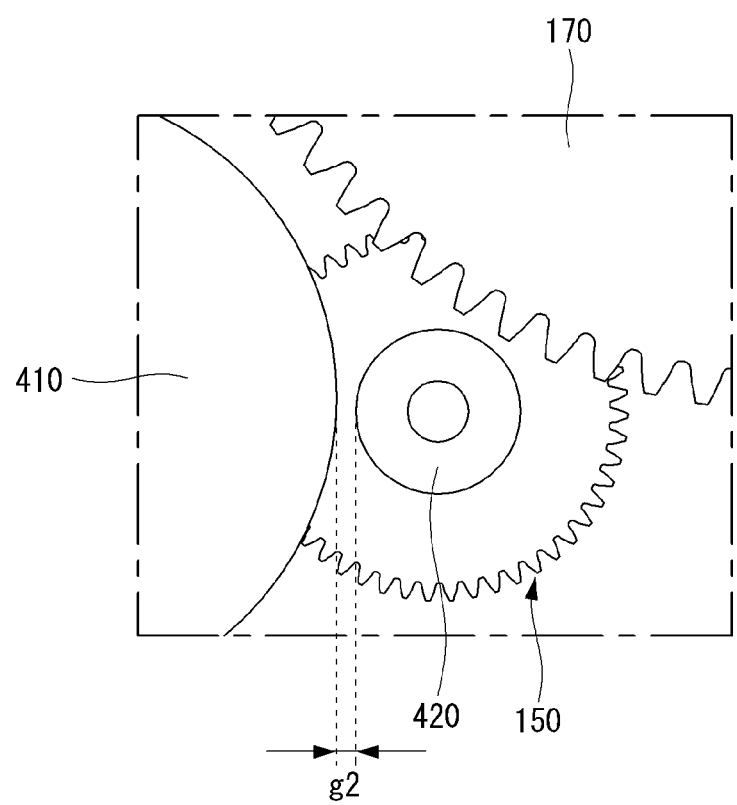
FIG. 17 is a plan view illustrating some components of a valve actuator according to the fourth embodiment of the disclosure.

FIG. 16 is a perspective view illustrating some components of a valve actuator according to a fourth embodiment of the disclosure. FIG. 17 is a plan view illustrating some components of a valve actuator according to the fourth embodiment of the disclosure.

Referring to FIGS. 16 and 17, according to the fourth embodiment of the disclosure, a valve actuator may include a housing 110, a motor 120 disposed on the housing 110, a drive gear 130 coupled to a motor shaft of the motor 120, transfer gears 140 and 150 circumscribing the drive gear 130 and rotating according to a first gear ratio when the drive gear 130 rotates, an output gear 170 coupled to an output shaft 180 and circumscribing the transfer gears 140 and 150, and a stopper 190 disposed in the housing 110 and limiting a rotation radius of the output gear 170.

It may be appreciated that detailed configurations of the valve actuator not described in connection with the fourth embodiment of the disclosure are identical the detailed configurations of the valve actuator 20 according to the first embodiment of the disclosure.

The transfer gears 140 and 150 may include a first transfer gear 140, which circumscribes the drive gear 130 and rotates according to a first gear ratio with respect to the drive gear 130 when the drive gear 130 rotates, and a second transfer gear 150, which rotates according to a second gear ratio with respect to the first transfer gear 140 when the first transfer gear 140 rotates. The second transfer gear 150 may circumscribe the output gear 170.

The transfer gears 140 and 150 may include a cylindrical first magnet 410 disposed on the first transfer gear 140 and a cylindrical second magnet 420 disposed on the second transfer gear 150. The first magnet 410 may be horizontally spaced apart from the second magnet 420. For example, a predetermined gap g2 may be formed between the first magnet 410 and the second magnet 420. The first magnet 410 and the second magnet 420 may overlap each other in a horizontal direction.

Thus, when the torque of the motor 120 is applied while the output gear 170 and the stopper 190 are in contact, the first transfer gear 140 idles with respect to the second transfer gear 150 due to the first magnet 410 and the second magnet 420, preventing damage to the drive gear 130, the transfer gears 140 and 150, and the output gear 170.

Further, it is possible to prevent damage to the drive gear 130, the transfer gears 140 and 150, and the output gear 170 without separate components, such as a sensor for detecting contact of the output gear 170 to the stopper 190, a limiter switch, or a PCB for stop signals, thus reducing the size and manufacturing costs of the product.

Further, when the motor 120 over-outputs, the first transfer gear 140 idles with respect to the second transfer gear 150 due to the first magnet 410 and the second magnet 420, damping the torque of the motor 120 applied due to the over-output and hence preventing damage to the drive gear 130, the transfer gears 140 and 150, and the output gear 170.

The first magnet 410 may include a plurality of first magnet units arranged in a circumferential direction, and the second magnet 420 may include a plurality of second magnet units arranged in a circumferential direction.

The plurality of first magnet units may be magnetized to have different poles from neighboring magnet units, and the plurality of second magnet units may be magnetized to have different poles from neighboring magnet units. The first magnet unit and the second magnet unit facing each other, among the plurality of first magnet units and the plurality of second magnet units, may have different polarities. The ratio of the number of the plurality of first magnet units to the number of the plurality of second magnet units may be identical to the second gear ratio.

According to the fifth embodiment of the disclosure, a valve actuator may include a housing 110, a motor 120 disposed on the housing 110, a drive gear 130 coupled to a motor shaft of the motor 120, a cylindrical first magnet 410 coupled to the drive gear 130, an output gear 170 coupled to an output shaft 180, a cylindrical second magnet 420 coupled to the output gear 170, and a stopper 190 disposed in the housing 110 and limiting a rotation radius of the output gear 170.

It may be appreciated that detailed configurations of the valve actuator not described in connection with the fifth embodiment of the disclosure are identical the detailed configurations of the valve actuator according to the fourth embodiment of the disclosure.

It may be appreciated that the valve actuator according to the fifth embodiment of the disclosure omits the transfer gears 140 and 150 of the valve actuator according to the fourth embodiment of the disclosure, and the first magnet 410 is coupled to the drive gear 130, and the second magnet 420 is coupled to the output gear 170.

Some of the above-described embodiments are interpreted as excluding or distinguishing from other embodiments. The components or functions in some embodiments described above may be used together or combined with the components or functions in other embodiments.

For example, component A described in connection with a particular embodiment and the drawings may be combined or merged with component B described in connection with another embodiment and the drawings. In other words, a combination of components, although not explicitly described, may be rendered possible unless stated as impossible.

Thus, the above description should be interpreted not as limiting in all aspects but as exemplary. The scope of the disclosure should be determined by reasonable interpretations of the appended claims and all equivalents of the disclosure belong to the scope of the disclosure.

LEGEND OF REFERENCE NUMBERS

10: ball valve 11: plate
20: valve actuator 110: housing
120: motor 130: drive gear
140, 150, 160: transfer gear 170: output gear
180: output shaft 190: stopper
200: magnet 210: first magnet
220: first magnet 300: drive gear
410: first magnet 420: second magnet
1431, 1433: groove

What is claimed is:

1. A valve actuator, comprising:
a housing;
a motor that is disposed in the housing and that includes a motor shaft;
a drive gear coupled to the motor shaft;
a transfer gear engaging with the drive gear and that is configured to, based on the drive gear rotating, be rotated according to a predetermined gear ratio;
an output shaft disposed in the housing;
an output gear that is coupled to the output shaft and engaging with the transfer gear; and
a stopper that is disposed in the housing and that is configured to control a rotation radius of the output gear,
wherein the transfer gear comprises an inner part, an outer part disposed at an outside of the inner part, a first magnet disposed at the outer part, and a second magnet that is disposed at the inner part and that faces the first magnet.

2. The valve actuator of claim 1, wherein the first magnet and the second magnet have different polarities.

3. The valve actuator of claim 2, wherein an attractive force between the first magnet and the second magnet is (i) greater than an average output force of the motor and (ii) less than a maximum output force of the motor.

4. The valve actuator of claim 1, wherein the first magnet comprises a plurality of first magnet units each having a polarity different from adjacent magnet units, and the second magnet comprises a plurality of second magnet units each having a polarity different from adjacent magnet units and facing the plurality of first magnet units.

5. The valve actuator of claim 1, wherein the motor is a direct current (DC) motor.

6. The valve actuator of claim 1, wherein an upper end and a lower end of the inner part are supported by an inner surface of the housing, and an upper end or a lower end of the outer part is vertically supported by the inner part.

7. The valve actuator of claim 6, wherein a height of the first magnet is greater than a height of the second magnet.

8. The valve actuator of claim 6, wherein a central area of the first magnet is disposed above a central area of the second magnet based on the upper end of the outer part being vertically supported by the inner part, and
wherein the central area of the first magnet is disposed below the central area of the second magnet based on the lower end of the outer part being vertically supported by the inner part.

9. The valve actuator of claim 6, wherein the inner part provides a groove at an area supporting the upper end or the lower end of the outer part.

10. The valve actuator of claim 9, wherein a lubricant is disposed on the groove.

11. The valve actuator of claim 1, wherein the transfer gear includes:
a first gear engaging with the drive gear,
a second gear engaging with the first gear, and
a third gear engaging with the second gear, and
wherein the first gear includes the outer part, the inner part, the first magnet, and the second magnet.

12. A valve actuator, comprising:
a housing;
a motor that is disposed in the housing and that includes a motor shaft;
a drive gear coupled to the motor shaft;
an output shaft disposed in the housing;
an output gear that is coupled to the output shaft and engaging with the drive gear; and
a stopper that is disposed in the housing and that is configured to control a rotation radius of the output gear,
wherein the drive gear comprises an inner part, an outer part disposed at an outside of the inner part, a first magnet disposed at the outer part, and a second magnet that is disposed at the inner part and that faces the first magnet.

13. The valve actuator of claim 12, wherein the inner part is coupled to the motor shaft and rotates along with the motor shaft, and an upper end or a lower end of the outer part is vertically supported by the inner part.

14. The valve actuator of claim 13, wherein a height of the first magnet is greater than a height of the second magnet.

15. The valve actuator of claim 13, wherein a central area of the first magnet is disposed above a central area of the second magnet based on the upper end of the outer part being vertically supported by the inner part, and
wherein the central area of the first magnet is disposed below the central area of the second magnet based on the lower end of the outer part being vertically supported by the inner part.

16. The valve actuator of claim 13, wherein the inner part provides a groove at an area supporting the upper end or the lower end of the outer part, and
wherein a lubricant is disposed on the groove.

17. A valve actuator, comprising:
a housing;
a motor that is disposed in the housing and that includes a motor shaft;
a drive gear coupled to the motor shaft;
a transfer gear engaging with the drive gear and that is configured to, based on the drive gear rotating, be rotated according to a first gear ratio;
an output shaft disposed in the housing;

an output gear that is coupled to the output shaft and that is in contact with the transfer gear; and a stopper that is disposed in the housing and that is configured to control a rotation radius of the output gear, wherein the transfer gear comprises a first transfer gear, a second transfer gear configured to, based on the first transfer gear rotating, be rotated according to a second gear ratio, a cylindrical first magnet disposed on the first transfer gear, and a cylindrical second magnet disposed on the second transfer gear, and wherein the cylindrical first magnet and the cylindrical second magnet horizontally overlap each other and define a predetermined gap.

18. The valve actuator of claim 17, wherein the cylindrical first magnet comprises a plurality of first magnet units that are arranged in a circumferential direction, and the cylindrical second magnet comprises a plurality of second magnet units that are arranged in the circumferential direction, wherein each of the plurality of first magnet units is magnetized to have a polarity different from neighboring magnet units, and each of the plurality of second magnet units is magnetized to have a polarity different from neighboring magnet units, and wherein a first magnet unit of the plurality of first magnet units and a second magnet unit of the plurality of second magnet units have different polarities, the first magnet unit and the second magnet unit facing each other.

19. The valve actuator of claim 18, wherein a ratio of a number of the plurality of first magnet units to a number of the plurality of second magnet units is identical to the second gear ratio.

20. The valve actuator of claim 17, wherein the second transfer gear is engaging with the output gear.

* * * * *